United States Patent
Chen et al.

[11] Patent Number: 5,602,918
[45] Date of Patent: Feb. 11, 1997

[54] APPLICATION LEVEL SECURITY SYSTEM AND METHOD

[75] Inventors: James F. Chen; Jieh-Shan Wang, both of Potomac, Md.

[73] Assignee: Virtual Open Network Environment Corp., Rockville, Md.

[21] Appl. No.: 593,240

[22] Filed: Dec. 22, 1995

[51] Int. Cl.$^6$ ............................. H04L 9/00; H04L 9/08
[52] U.S. Cl. ............................. 380/21; 380/23; 380/25; 380/49
[58] Field of Search ............................. 380/21, 25, 49, 380/23, 24

[56] References Cited

U.S. PATENT DOCUMENTS

| | | | |
|---|---|---|---|
| 4,649,233 | 3/1987 | Bass et al. | 380/21 |
| 4,862,501 | 8/1989 | Kamitake et al. | 380/50 |
| 4,890,323 | 12/1989 | Beker et al. | 380/25 |
| 5,048,085 | 9/1991 | Abraham et al. | 380/23 |
| 5,202,922 | 4/1993 | Iijima | 380/45 |
| 5,237,611 | 8/1993 | Rasmussen et al. | 380/21 |
| 5,272,754 | 12/1993 | Boerbert | 380/25 |
| 5,345,506 | 9/1994 | Tsubakiyama et al. | 380/23 |
| 5,347,580 | 9/1994 | Molva | 380/25 |
| 5,473,689 | 12/1995 | Eberhard | 380/23 |
| 5,475,757 | 12/1995 | Kelly | 380/24 |
| 5,491,749 | 2/1996 | Rogaway et al. | 380/21 |
| 5,491,750 | 2/1996 | Bellare et al. | 380/21 |
| 5,497,411 | 3/1996 | Pellerin | 379/59 |

*Primary Examiner*—Thomas H. Tarcza
*Assistant Examiner*—Pinchus M. Laufer
*Attorney, Agent, or Firm*— Bacon & Thomas

[57] ABSTRACT

A system and method for establishing secured communications pathways across an open unsecured network, without compromising the security of any parties to the communication, involves establishing secured gateways or firewalls between the Internet and any party which desires protection by 1.) using a smart card to distribute shared secret keys between a computer which serves as the above-mentioned firewall and a client node on the Internet; 2.) using the shared private keys to establish mutual authentication between the gateway and the smartcard; 3.) generating a session or temporary secret key for use in further communications between the gateway and the client node once communications have been established; and 4.) encrypting further communications using the session key.

7 Claims, 4 Drawing Sheets

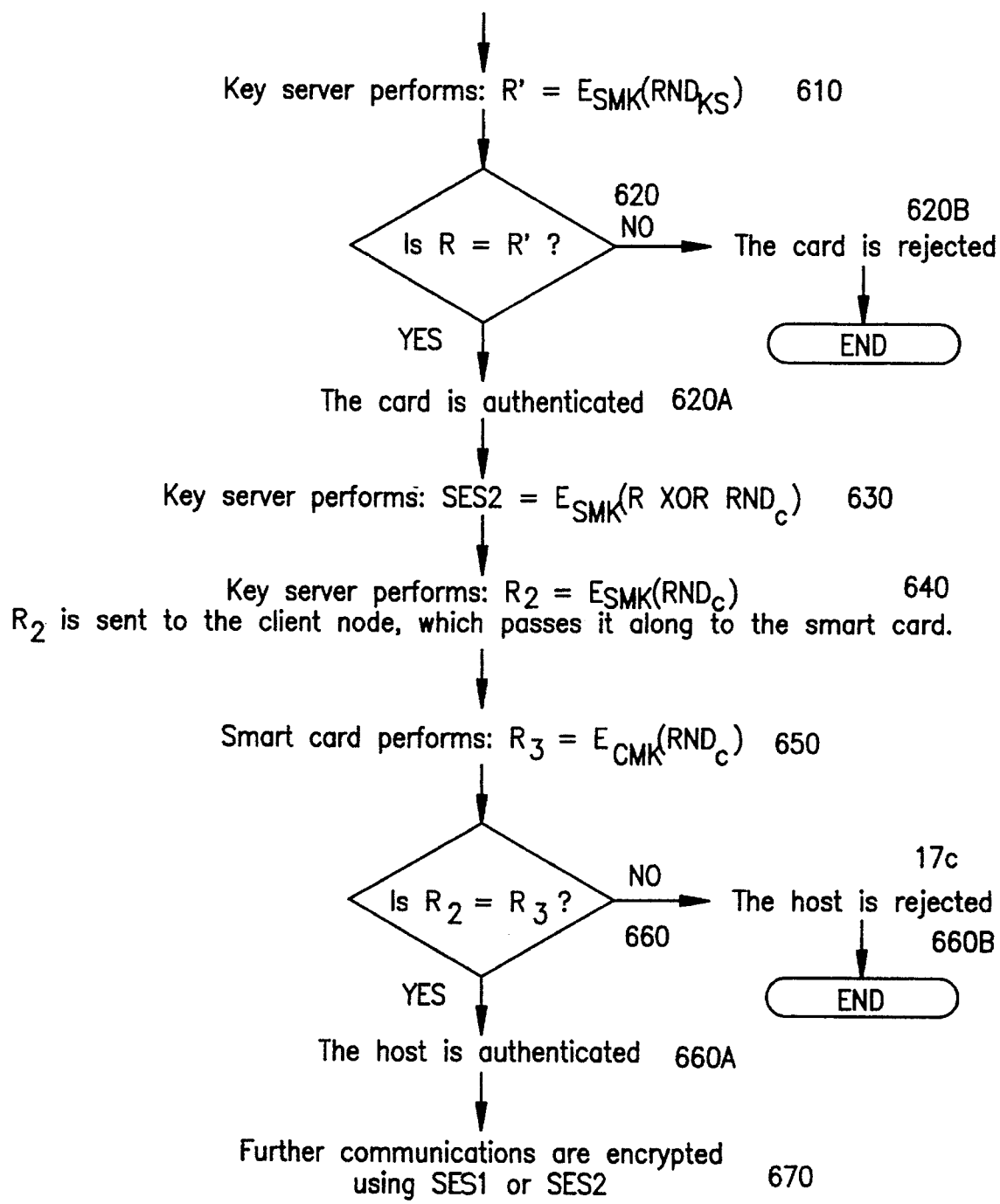

APPLICATION LEVEL SECURITY SYSTEM AND METHOD

BACKGROUND OF THE INVENTION

1. Field of the Invention

This invention relates to a system and method for establishing secured communications pathways over an unsecured open network.

2. Description of Related Art

The present invention involves the use of "smartcard" technology to facilitate the sending of authenticatable documents over the Internet. It may be used with the systems and methods described in copending U.S. patent application Ser. Nos. 08/285,134, filed Aug. 3, 1994, and Ser. No. 08/416, 045, filed Apr. 4, 1995. The first of the two copending applications describes the use of smartcard technology to digitally sign information for electronic authentication, while the second of the two applications describes the use of smartcard technology to facilitate electronic payments and protect account information transmitted over the Internet in connection with the payments. The present application involves the same smartcard technology described in the first two copending applications, but provides for mutual authentication of the parties to the communication upon the initial establishment of a communications channel, and the generation of a session key in order to secure the channel.

The Internet currently connects millions of users worldwide, and each individual user may possess one or more computers of any type, with access to the system occurring through what is referred to as a "client node." When a sensitive file is transmitted over an unsecured network such as the Internet, not only must the sender ensure that the file cannot be accessed by unauthorized parties, but the recipient is often faced with the challenge of verifying that a received document has not been tampered with, and that the purported sender is the actual originator of the document.

Current digital signature generating and file encryption methods, including DES and private/public key cryptosystems, provide adequate protection if both parties have the capability of generating the necessary keys. However, since the protection provided by a key is generally a function of the relative computing power between the key generator and those attempting to defeat the key, and since key generation technology often cannot be exported, key generation is best left to agencies known as "key servers," having the capability both of generating and protecting the keys thus generated.

A weakness of any system which relies on key servers lies in the initial establishment of communications between the parties to the communication and the key server. The same problems noted above, involving authentication of the parties to a communication, are also present in communications between the respective parties to a communication and the agency which provides encryption services to those parties, even though the key server might possess its own secured network. Also, once the parties to the communication are authenticated, there remains the problem of key distribution. Distribution of keys over the public network is obviously the most convenient method of key distribution, but such electronic transfer is generally less secure than distribution of keys by means other than electronic transfer or by means of a completely secured network line. The present invention seeks to address the problems of authentication and key distribution by providing; the gateway or firewall including a gateway processor with the client communicates directly during a session to develop a common session key without the need for key exchange over the network gateway or firewall between the key server and the Internet.

While the present invention is particularly well suited to the establishment of secured communications channels over the Internet itself, those skilled in the art will appreciate that the principles of the invention are generally applicable to any communications carried out over an unsecured network, in which a firewall needs to be established between at least one of the parties to the communication and the unsecured network. The invention can in general be used to protect any private network for which an Internet node is desired without compromising the privacy of the network, including government and commercial networks.

The present invention is thus designed to enable parties on a secured network to communicate via the Internet or the public network by establishing safe passage between the secured network and the party on the public network, while maintaining an otherwise impenetrable "firewall" between the public network and the secured network.

SUMMARY OF THE INVENTION

It is accordingly an objective of the invention to provide a system and method of establishing secured communications pathways across an open unsecured network, without compromising the security of any parties to the communication, by establishing secured gateways or firewalls between the Internet and any party which desires protection.

It is a further objective of the invention to enable parties on an unsecured network to exchange authenticatable files instantaneously using a key server to generate digital signatures and/or encryption keys, and without initial certainty by either party as to the legitimacy of the purported key server.

It is a still further objective of the invention to enable parties on an unsecured network to exchange authenticatable files instantaneously using a key server to generate digital signatures and/or encryption keys, and without initial certainty by the key server as to the identity of the parties requesting the digital signature and/or keys.

It is yet another objective of the invention to provide a system and method for establishing secured communications pathways between a private network and an open unsecured network, in order to enable data communications to be carried out between a party on the unsecured network and a party on the secured network, while minimizing the complexity and hardware requirements of the system.

These objectives are accomplished, in a preferred embodiment of the invention, by 1.) Using a smart card to distribute shared secret keys between a computer which serves as the above-mentioned firewall and a client node on the Internet;

2.) Using the shared private keys to establish mutual authentication between the gateway and the smartcard;

3.) Generating a session or temporary secret key for use in further communications between the gateway and the client node once communications have been established;

4.) Encrypting further communications using the session key.

Still further security can be obtained by arranging a key server to perform partial digital signing while allowing the smartcard to perform the remainder of the digital signing.

As a result of the preferred system and method, a highly secured physical environment is obtained in which parties on either side of the firewall are protected against outside attacks. The gateway processor will not communicate with anyone unless the user and his or her smart card pass a challenge-response test, while the smart cards themselves are protected by being in the possession of the user and may easily be further protected by a secret code. These and other advantages of the invention will become more apparent based on the following description, although it should be appreciated by those skilled in the art that not all of the advantageous features are mandatory, and that portions of the invention may be omitted or varied without departing from the intended scope of the invention.

BRIEF DESCRIPTION OF THE DRAWINGS

FIG. 3a and 3b are a flowchart showing a method of establishing the identity of both the gateway processor and a client and of generating a session key for use during transfer of a digital signature or decrypted encryption session key between the gateway processor and the client sender or receiver.

DETAILED DESCRIPTION OF THE PREFERRED EMBODIMENTS

Figure 1:
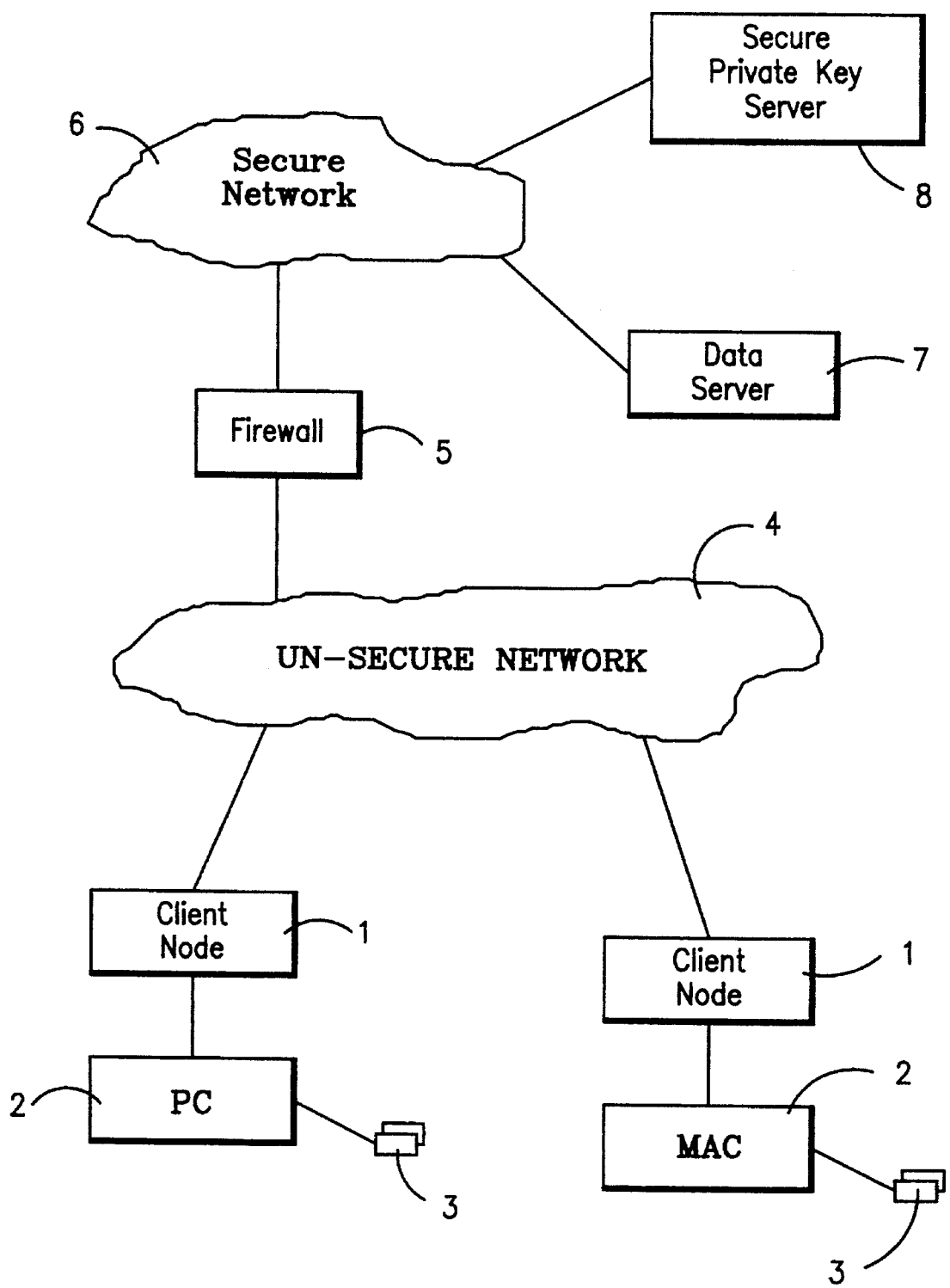
FIG. 1 is a schematic diagram of a system constructed in accordance with the principles of a preferred embodiment of the invention.

The preferred embodiment of the invention is practiced on an unsecured public communications network such as the Internet, for connecting a plurality of client nodes 1, each of which is equipped with a computer 2 and a smartcard reader for reading information and files from a smartcard 3.

Those skilled in the art will appreciate that the term "smartcard" as used herein is intended to refer to a variety of media, including both integrated circuit "chipcards" and PCMCIA cards. Each client node may communicate with any other client node on the Unsecured network using appropriate communications software, and without any prior relationship between the parties to the communication.

The smartcard has stored thereon a shared secret key which is preferably inaccessible even to the user possessor of the card, and which is associated with a corresponding secret key stored in a form accessible to a gateway processor or firewall situated at another Internet client node. The gateway processor controls communications, in the illustrated embodiment, with clients of a secure network 6, including a data server 7 containing information to which access is restricted, and a private key server 8. It will be appreciated by those skilled in the art that the "secure network" need not take the specific form illustrated, but in practice can be any computer or group of computers to which controlled access is required. In whatever form, however, no data is allowed to pass this "firewall" unless communications are authenticated through the use of a secret key.

As in the system described in the above-cited U.S. patent application Ser. No. 08/285,134, the smartcard used to secure communications in the illustrated embodiment of the invention must be initialized before it can be used, i.e., the keys necessary to establish initial communications must be pre-stored on the card before the card is transferred to the client. Those skilled in the art will appreciate that after a secured communication has been established, it is possible to arrange for changing of the keys in a manner unobservable by the cardholder using encrypted keys, so as to provide greater protection for the server, although for many purposes such additional security may not be necessary.

Generally, initialization will be carried out by the private key server at a physically secure location in which is situated at card initialization terminal 7. Initialization involves storing on the card information which will be used later for the purposes of authenticating communications between the gateway processor and the client, as well as for developing the actual keys used to encrypt files for sending. The information includes, for the illustrated embodiment, a unique user I.D. and the card's DES master key (CMK) (used by the sender of a file to generate a DES session key (SES) each time a file is sent). In addition, the smartcard may be encoded with additional information or keys, such as is described in copending U.S. patent application Ser. No. 08/416,045, filed Apr. 4, 1995.

Figure 2:
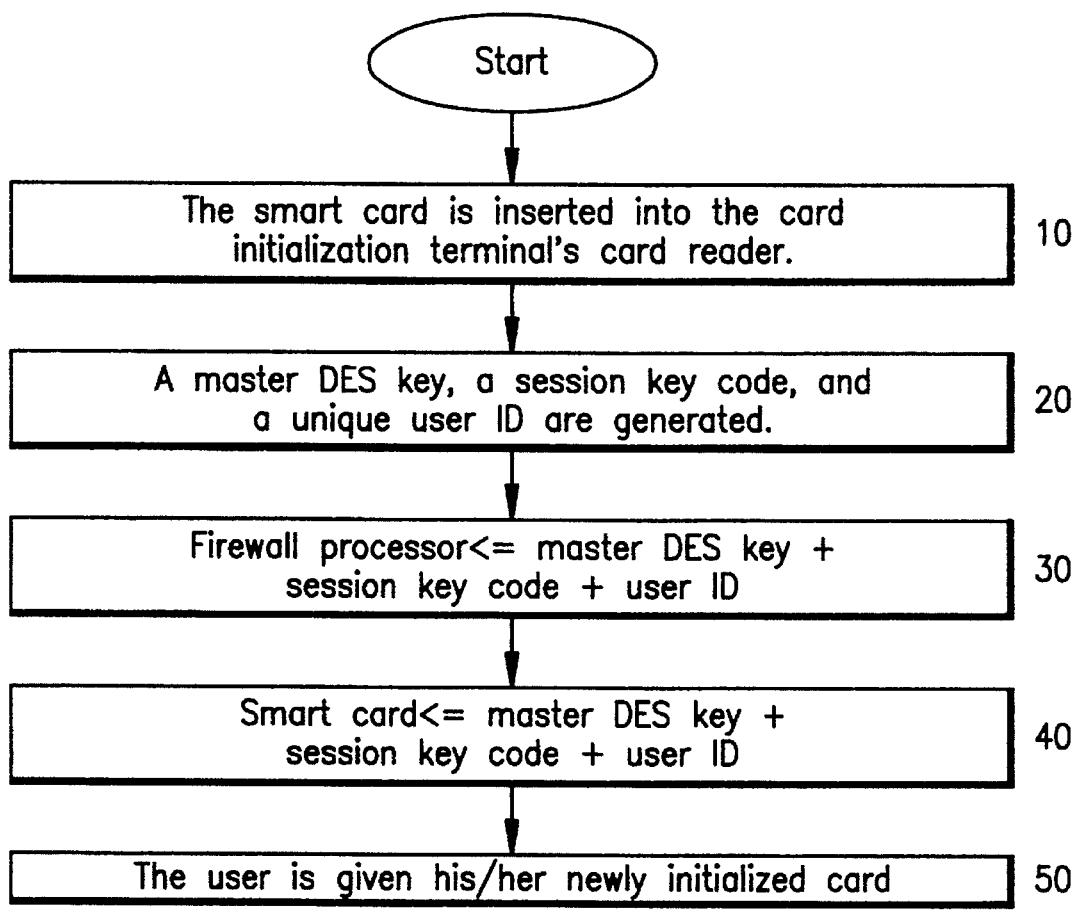
FIG. 2 is a flowchart showing a method of preparing a smartcard for use in implementing the principles of a preferred embodiment of the invention.
Figure 3A:
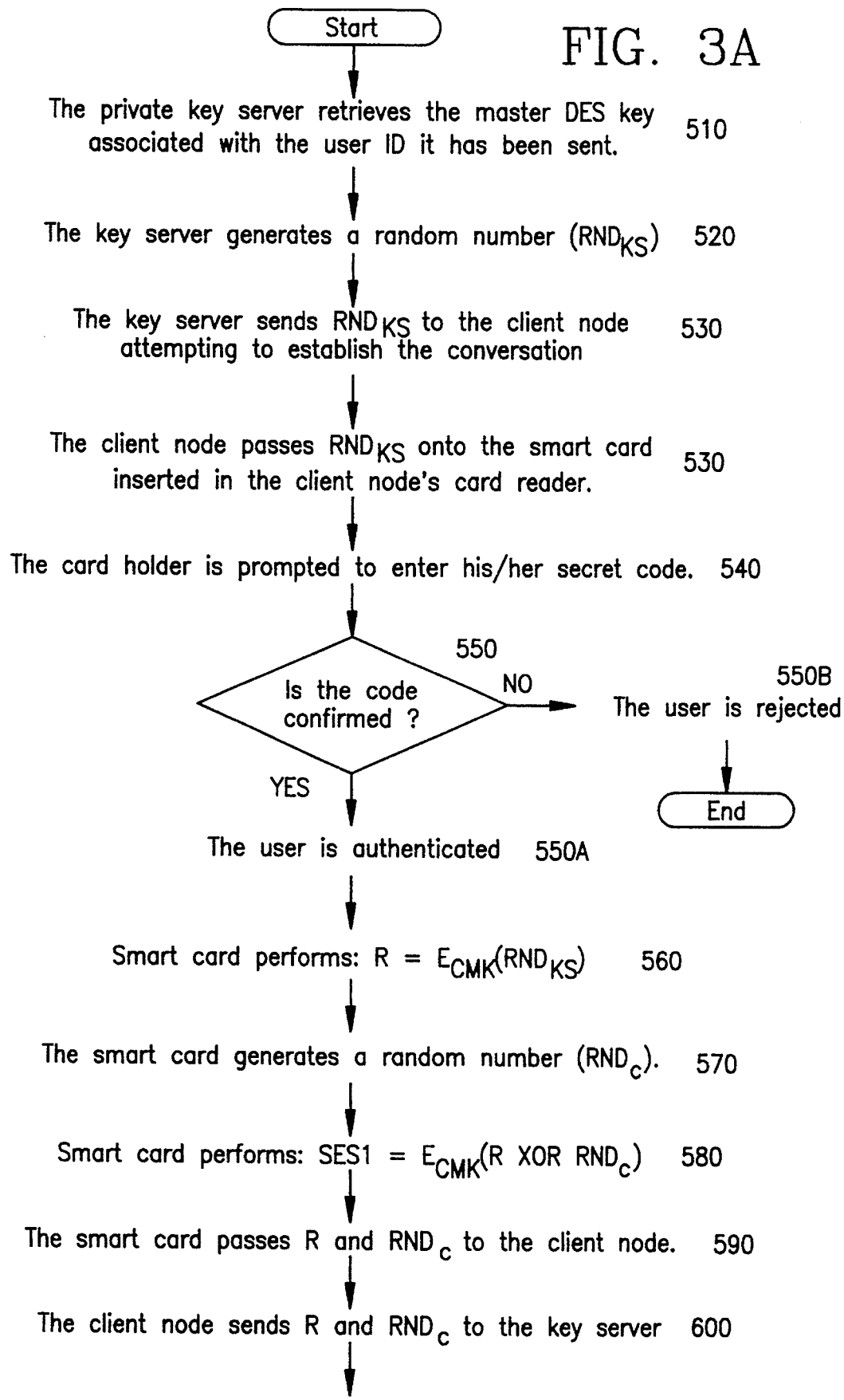

Initially, as illustrated in FIG. 2, a smart card (or other IC chip-based medium, such as an IC chip which has been removed from the card) is inserted into the card initialization terminals card reader (step 10) and the gateway processor's master DES key (SMK) and the unique user ID are generated (step 20). The next step in the card initialization process is to store the master DES key (CMK) (which is the same as the gateway processor's master DES key (SMK)) and user ID on the smart card (step 40), after which the card may be transferred to the client (step 50). Preferably, the information stored on the card is protected during the transfer by a non-secret code which can be changed upon receipt by the cardholder to ensure that only the original cardholder will be able to use the card.

When a client wishes to establish communication with a party on the secured network, for example to obtain a digital signature for use in sending an authenticatable file to another unsecured client node, the client node 1 sends a request to the gateway processor in order to begin a mutual authentication procedure which involves using master DES keys (CMK) and (SMK), and random numbers $RND_{KS}$ and $RND_C$ generated respectively by the gateway processor and the client, to establish to their mutual satisfaction the identity of both the gateway processor and the client and to generate a DES session key (SES).

When the gateway processor receives the request for establishing communications with a party on the secure side of the gateway, it retrieves the master DES key (SMK) associated with the user ID it has been sent (step 500). The gateway processor then generates a random number ($RND_{KS}$) (step 510), and sends the random number ($RND_{KS}$) to the client node 1 attempting to establish the conversation (step 520). The client node 1 passes the random number ($RND_{ks}$) on to the smartcard 3 inserted in the client node's card reader. The cardholder is prompted to enter his or her secret code or password (step 550) which was established when the initialized smartcard was initially obtained from the key server. If the user is not authorized, the procedure terminates (step 550B). If the secret code is validated (step 550A), enabling access to the smart card, the smart card encrypts the random number ($RND_{KS}$) using the card's master DES key (step 560) and generates another random number ($RND_C$) which is combined with the encrypted first random number ($RND_{KS}$) using an exclusive OR function and encrypted using the card's master DES key to obtain a DES session key (SES1) (step 580). The smart card passes the encrypted gateway processor random number ($E_{CMK}(RND_{KS})$, and random number $RND_C$ to the client node 1 (step 590) which forwards $E_{cmk}(RND_{KS})$ and $RND_C$ to the gateway processor (step 600).

In order for the gateway processor to verify the identity of the smart card, and thus of the client, the gateway processor encrypts the gateway processor's random number ($RND_{KS}$) using the gateway processor's master DES key (SMK) (step 610) and compares the result with the encrypted random number ($E_{SMK}(RND_{KS})$) received from the client node 1 in order to verify whether the card's DES key (CMK) is the same as the gateway processor's master DES key (SMK) (step 620). If they are the same, the client node's smart card is accepted as authentic (step 620A), but if they are not, the client's card is rejected as unauthorized (step 620B) and the communication terminated by the gateway processor. If the card is authentic, the gateway processor combines the card's random number ($RND_C$) with the encrypted gateway processor random number $E_{SMK}(RND_{KS})$) using the same exclusive OR function as used by the card (step 630) to obtain another session key ($SES2=E_{SMK}(R\ XOR\ RND_C)$). The gateway processor then encrypts $RND_C$ with SMK, $E_{SMK}(RND_C)$ and sends it back to the client node.

Finally, in order to verify that the party with which the client is communicating is in fact the legitimate gateway processor, the smart card encrypts $RND_c$ with CMK (step 650) and compares the result with $E_{SMK}(RND_C)$ sent back by the gateway processor (step 660) at which time the host is either authenticated (step 660A) after which the session keys SES1 or SES2, which are the same, are used by the respective parties to encrypt further communications (step 670), or the host is rejected and the communication terminated (step 660B).

In summary, the illustrated mutual identification procedure allows the gateway processor to verify the legitimacy of the client by determining whether a random number RND generated by the gateway processor and encrypted using the client's DES master key is properly encrypted, while the gateway processor is authenticated by the client upon return of the encrypted $RND_C$ generated by the client. Although preferred, however, those skilled in the art will appreciate that a number of the above-described steps could be varied, with or without sacrificing the level of security provided by the preferred method. For example, two-way authentication may not always be required, while the random numbers could be replace by other codes, and the exclusive OR operation could be replaced by other methods for combining the respective random numbers $RND_{KS}$ and $RND_C$.

This method may be used in a variety of ways to protect communications between the client node 1 and clients of the secured network behind the gateway, for example to pass information to the private key server 8 for the purpose of generating a digital signature and perform at least a partial signing of the file to be sent over the Internet to another client (the use of partial digital signing by the key server is known as "coupon" generation). The resulting coupon can then also be protected by the session key and sent back to the smartcard for completion, although it is also within the scope of the invention to rely entirely on the private key server for the digital signing.

Having thus described a preferred embodiment of the invention in sufficient detail to enable those skilled in the art to make and use the invention, it is nevertheless intended that the above description not be taken as limiting, but rather that the invention be defined solely by the appended claims.

We claim:

1. A system for establishing secured communications pathways across an open unsecured network between a secured party and a possibly unsecured party, without compromising the security of either of the parties, comprising: a smartcard reader and a smartcard located at a client node of the unsecured party, the smartcard having stored thereon a shared secret key known to the secured party; a gateway processor which controls access from the open unsecured network to said secured party and having access to the shared secret key; means for authenticating communications between the respective parties based on said shared secret key and for generating session keys, wherein the smartcard reader includes means for prompting a card holder to enter a secret code and for confirming the code in order to authenticate the card holder before permitting further communications, and wherein the means for authenticating communication between the respective parties and for generating the session keys comprises:

means associated with the gateway processor for generating a first number and sending the first number to the smart card;

means on the smartcard for encrypting the first number by the shared secret key;

means on the smartcard for generating a second number and encrypting a combination of the encrypted first number and the second number;

means in the gateway processor for verifying whether the first number has been encrypted by the shared secret key, thereby authenticating the smartcard;

means in the gateway processor for generating a first session key by combining the encrypted first number with the second number and encrypting the combination;

means in the gateway processor for encrypting the second number by the shared secret key;

means in the smartcard for verifying whether the second random number has been encrypted by the shared secret key and thereby authenticating the gateway processor; and means in the smartcard for combining the encrypted first number with the second number and encrypting same to generate a second session key corresponding to the first session key generated by the gateway processor; and means for encrypting further communications between the respective parties using the first and second session keys.

2. A system as claimed in claim 1, wherein the secured party is connected by means of a secured communications line with a key server, and the further communications include a portion of a digital signature generated in part by the key server and a portion generated by the smartcard.

3. A system as claimed in claim 1, wherein said first and second numbers are random numbers.

4. A system as claimed in claim 1, wherein said combining means in the gateway processor and said combining means in the smartcard each comprises means for performing an exclusive or operation on the encrypted first number and the second number.

5. A method of establishing a secured communication pathway between a party on a private network and a party on an open unsecured network, comprising the steps of: reading from a smartcard a shared secret key; authenticating communications between the respective parties based on the shared secret key and generating session keys; and prompting a card holder to enter a secret code into the smartcard reader and confirming the code in order to authenticate the card holder before permitting further communications, wherein the step of authenticating communications between the respective parties and generating the session key comprises the steps of:

the gateway processor generating a first number and sending the first number to the smart card;

the smartcard encrypting the first number by the shared secret key;

the smart card generating a second number and encrypting a combination of the encrypted first number and the second number;

the gateway processor verifying whether the first number has been encrypted by the shared secret key, thereby authenticating the smartcard;

the gateway processor generating a session key by combining the encrypted first number with the second number and encrypting the result:

the gateway processor encrypting the second number by the shared secret key;

the smartcard verifying whether the second random number has been encrypted by the shared secret and thereby authenticating the gateway processor; and the smartcard combining the encrypted first number with the second number and encrypting same to generate a second session key corresponding to the first session key generated by the gateway processor: and further comprising the step of encrypting further communications between the respective parties using the first and second session keys.

6. A method as claimed in claim 5, wherein said first and second numbers are random numbers.

7. A method as claimed in claim 5, wherein the respective combining steps comprise the step of performing an exclusive or operation on the encrypted first number and the second number.

* * * * *